(12) United States Patent
Bernhard et al.

(10) Patent No.: US 10,343,314 B2
(45) Date of Patent: Jul. 9, 2019

(54) PREFOAMING OF POLY(METH)ACRYLIMIDE PARTICLES FOR SUBSEQUENT FOAM MOULDING IN CLOSED TOOLS

(71) Applicants: Kay Bernhard, Darmstadt (DE); Ina Liebl, Griesheim (DE); Denis Holleyn, Balduinstein (DE); Christoph Seipel, Babenhausen (DE)

(72) Inventors: Kay Bernhard, Darmstadt (DE); Ina Liebl, Griesheim (DE); Denis Holleyn, Balduinstein (DE); Christoph Seipel, Babenhausen (DE)

(73) Assignee: Evonik Roehm GmbH, Darmstadt (DE)

( * ) Notice: Subject to any disclaimer, the term of this patent is extended or adjusted under 35 U.S.C. 154(b) by 414 days.

(21) Appl. No.: 15/100,538

(22) PCT Filed: Dec. 3, 2014

(86) PCT No.: PCT/EP2014/076333
§ 371 (c)(1),
(2) Date: May 31, 2016

(87) PCT Pub. No.: WO2015/082509
PCT Pub. Date: Jun. 11, 2015

(65) Prior Publication Data
US 2016/0332344 A1 Nov. 17, 2016

(30) Foreign Application Priority Data
Dec. 6, 2013 (DE) .................. 10 2013 225 132

(51) Int. Cl.
| | |
|---|---|
| B29C 44/34 | (2006.01) |
| C08J 9/04 | (2006.01) |
| C08J 9/16 | (2006.01) |
| C08J 9/20 | (2006.01) |
| C08J 9/22 | (2006.01) |
| C08J 9/232 | (2006.01) |
| B29B 9/12 | (2006.01) |
| B29C 35/08 | (2006.01) |
| B29C 44/02 | (2006.01) |
| B29C 44/38 | (2006.01) |
| C08J 3/28 | (2006.01) |
| C08J 9/224 | (2006.01) |
| C08J 9/228 | (2006.01) |
| B29K 79/00 | (2006.01) |
| B29K 105/04 | (2006.01) |

(52) U.S. Cl.
CPC ............ B29C 44/3415 (2013.01); B29B 9/12 (2013.01); B29C 35/0805 (2013.01); B29C 44/02 (2013.01); B29C 44/3403 (2013.01); B29C 44/3461 (2013.01); B29C 44/38 (2013.01); C08J 3/28 (2013.01); C08J 9/04 (2013.01); C08J 9/16 (2013.01); C08J 9/20 (2013.01); C08J 9/22 (2013.01); C08J 9/224 (2013.01); C08J 9/228 (2013.01); C08J 9/232 (2013.01); B29C 2035/0822 (2013.01); B29K 2079/08 (2013.01); B29K 2105/048 (2013.01); C08J 2201/034 (2013.01); C08J 2205/10 (2013.01); C08J 2333/04 (2013.01); C08J 2333/18 (2013.01); C08J 2333/24 (2013.01)

(58) Field of Classification Search
CPC ........ B29C 35/0805; B29C 2035/0822; B29C 44/02; B29C 44/3403; B29C 44/3461; B29C 44/38; C08J 3/28; C08J 9/20; C08J 9/22; C08J 9/224; C08J 9/228; C08J 9/232; B29B 9/12
See application file for complete search history.

(56) References Cited

U.S. PATENT DOCUMENTS

| | | | |
|---|---|---|---|
| 3,627,711 A * | 12/1971 | Schroeder | C08J 9/02 264/DIG. 5 |
| 3,734,870 A * | 5/1973 | Schroeder | C08J 9/16 264/230 |
| 6,455,599 B1 | 9/2002 | Berghmans et al. | |
| 2014/0309361 A1 | 10/2014 | Buehler et al. | |
| 2015/0174798 A1* | 6/2015 | Pinto | B29C 51/421 264/413 |

FOREIGN PATENT DOCUMENTS

| | | |
|---|---|---|
| CN | 101415845 A | 4/2009 |
| DE | 1 817 156 A1 | 7/1970 |
| EP | 0 987 292 A1 | 3/2000 |
| JP | 7-323257 A | 12/1995 |
| JP | 11-188787 A | 7/1999 |
| WO | WO 2013/056947 A1 | 4/2013 |
| WO | WO 2014/161707 A1 | 10/2014 |

OTHER PUBLICATIONS

"Wien's law". Encyclopdia Britannica. Encyclopdia Britannica Online. Encyclopdia Britannica Inc., 2018. accessed at britancia.com on Jul. 1, 2018 . (Year: 2018).*
International Search Report dated Feb. 2, 2015, in PCT/EP2014/076333 filed Dec. 3, 2014.

* cited by examiner

Primary Examiner — Anthony Calandra
Assistant Examiner — Jamel M Nelson
(74) Attorney, Agent, or Firm — Oblon, McClelland, Maier & Neustadt, L.L.P.

(57) ABSTRACT

The invention relates to a process for the production of prefoamed poly(meth)acrylimide (P(M)I) particles which can be further processed to give foam mouldings or composites. A feature of this process is that a polymer granulate is first heated and thus prefoamed in an apparatus by means of IR radiation of a wavelength suitable for this purpose. Said granulate can be further processed in subsequent steps, e.g. in a press mould with foaming to give a moulding or a composite workpiece with foam core.

11 Claims, No Drawings

PREFOAMING OF POLY(METH)ACRYLIMIDE PARTICLES FOR SUBSEQUENT FOAM MOULDING IN CLOSED TOOLS

FIELD OF THE INVENTION

The invention relates to a process for the production of prefoamed poly(meth)acrylimide (P(M)I) particles, in particular of polymethacrylimide (PMI) particles, which can be further processed to give foam mouldings or composites. A feature of this process is that a polymer granulate is first heated and thus prefoamed in an apparatus by means of IR radiation of a wavelength suitable for this purpose. Said granulate can be further processed in subsequent steps, e.g. in a press mould with foaming to give a moulding or a composite workpiece with foam core. When polymer particles, in particular P(M)I particles, are foamed in closed moulds, the effect of gravity inter alia leads to non-uniform distribution of the individual particles in the mould and therefore to inhomogeneous density distribution. In the invention, this is countered by, before material is charged to the mould, prefoaming the particles to a bulk density that permits a very high degree of filling of the component mould. Before the actual foam moulding process, therefore, the mould has been completely filled by free-flowing material, and the cavities between the particles are then filled with foam by further foaming with exposure to heat. In the invention it is possible to ensure homogeneous density distribution in the component and therefore to achieve homogeneous properties of the final product.

PRIOR ART

DE 27 26 260 describes the production of poly(meth) acrylimide foams (P(M)I foams) which have excellent mechanical properties even at high temperatures. The foams are produced by the cast process, i.e. the monomers and additional substances required are mixed and polymerized in a chamber. In a second step, the polymer is foamed by heating. These processes are very complicated and are difficult to automate.

DE 3 630 930 describes another process for the foaming of the abovementioned copolymer sheets made of methacrylic acid and methacrylonitrile. Here, the polymer sheets are foamed with the aid of a microwave field, and this is therefore hereinafter termed the microwave process. A factor that must be taken into account here is that the sheet to be foamed, or at least the surface thereof, must be heated in advance up to or above the softening point of the material. Since under these conditions the material softened by the external heating naturally also begins to foam, it is not possible to control the foaming process solely through the effect of a microwave field: instead, it requires concomitant external control by an ancillary heating system. This means that a microwave field is added to the normal single-stage hot-air process, in order to accelerate foaming. However, the microwave process has proved to be too complicated and therefore of no practical relevance, and has not yet been used. Furthermore, very high-energy radiation of low wavelength is required in order to ensure a sufficient depth of penetration into the sheet. Nevertheless, this process is extremely inefficient, and without additional heating the irradiation time would be at least 30 min., even for very thin sheets.

Mechanically stable PMI foams crosslinked with allyl methacrylate are found in EP 356 714. By way of example, azobisisobutyronitrile is used as free-radical generator, and from 0.1% by weight to 10% by weight of electrically conductive particles are added to the mixture to be polymerized. Although these foams are very robust, they have only a very small tensile strain at break. The same applies to the PMI foams disclosed in JP 2006 045532, ionically crosslinked by metal salts. However, again these foams are produced from polymer sheets and, after foaming, are cut or sawn to shape in a complicated process.

Alongside PMI foams, there are other known foams based on methacrylic acid and acrylonitrile (PI foams) with similar properties. These are described by way of example in CN 100420702C. However, again these foams are produced from sheets.

Alongside these processes which start from an unfoamed polymer sheet, there are known "in-mould foaming" processes starting from granulate. However, in principle these have a number of disadvantages in comparison with the processes described. A non-uniform pore structure is achieved, which has differences between the interior of the original particles and the boundaries between the original particles. Furthermore, the density of the foam is also inhomogeneous, by virtue of the non-uniform distribution of the particles during foaming—as described above. These products foamed from granulate can moreover be observed to have relatively poor cohesion at the boundaries that form between the original particles during foaming, and therefore have poorer mechanical properties than materials foamed from a semifinished sheet.

WO 2013/056947 describes an in-mould process in which at least the latter problem has been solved, in that, before the particles are charged to the shaping and foaming mould they are coated with an adhesion promoter, e.g. with a polyimide or with a polymethacrylate. Very good adhesion is thus achieved at the grain boundaries. However, this method does not eliminate the non-uniform pore distribution in the final product.

OBJECT

In the light of the prior art discussed, it was therefore an object of the present invention to provide a novel process which can provide P(M)I particles for in-mould foaming in a simple manner and at high throughput rate. The intention is that it be possible to carry out this process rapidly and with low energy consumption.

A particular object of the present invention was to provide a P(M)I material for in-mould foaming which leads to uniform density distribution in the final product.

A further intention is that the process for the pretreatment of the particles for in-mould foaming can be carried out rapidly and continuously.

Other objects not explicitly discussed at this point can be discerned from the prior art, the Description, the Claims or the embodiments.

ACHIEVEMENT OF OBJECT

The term poly(meth)acrylimide hereinafter means polymethacrylimides, polyacrylimides and mixtures thereof. Similar considerations are applied to the corresponding monomers such as (meth)acrylimide and (meth)acrylic acid. By way of example, the term (meth)acrylic acid means not only methacrylic acid but also acrylic acid, and also mixtures of these two.

The objects are achieved through a novel process for the production of prefoamed poly(meth)acrylimide (P(M)I) particles that can be used for in-mould foaming, or of composite materials with a foam core made of a rigid foam, or of mouldings made of a P(M)I foam, where these have been produced with said P(M)I particles. A feature of this process is that unfoamed P(M)I particles are prefoamed by infrared radiation, at least 80% of which has a wavelength of from 1.4 to 10.0 μm.

For this, it is preferable to use an IR source which emits to an extent of at least 5% in a middle to long IR region with a wavelength range from 5.0 to 9.0 μm. Very particular preference is given here to two wavelength ranges separate from one another in which the IR source emits to an extent of at least 5%. The first of these two ranges is from 5.3 to 6.5 μm. The second preferred wavelength range is from 7.8 to 8.9 μm. Surprisingly, IR radiation with a wavelength in one of these two ranges can be used particularly effectively for the prefoaming process.

This type of radiation is particularly preferably realized by using IR sources which have a temperature of from 780 K to 1800 K, calculated by Wein's method, in particular from 800 to 1200 K. The IR radiation is classified in accordance with DIN 5031.

Particularly surprisingly, it has been found that IR radiation with the stated wavelengths, in particular with the preferred wavelengths, is very suitable for the prefoaming of P(M)I particles. For the sheet-form P(M)I that is known from the prior art, radiation sources used are by way of example 2000 K sources. These IR sources have an emission maximum at about 1.2 μm. They emit high-energy radiation which ensures an appropriate depth of penetration into the material. However, these sources have almost no emission in a wavelength region above 5.0 μm. Surprisingly, it has been found that in the process of the invention precisely this emission region is particularly suitable for the prefoaming of P(M)I particles.

In one preferred embodiment, the conduct of the process of the invention is such that he P(M)I particles that have not been prefoamed are placed onto a transport apparatus, for example a conveyor belt, and are transported through a heating unit with appropriate sources of IR radiation which in particular emit in the desired wavelength range. In order to obtain particularly good results, the manner of loading of this transport apparatus should be such that the P(M)I particles form a single layer thereon and are all directly irradiated by the sources of IR radiation. This prefoaming can preferably have been concluded after as little as 5 min, particularly preferably after 3 min. The prefoaming time here for the embodiment described is a function of the particle size, of the type of blowing agent and concentration of blowing agent, of the wavelength, of the distance from the radiation sources and of the radiation intensity. The transport rate to be set for the particles is in turn a function of the prefoaming time.

The radiation intensity and radiation time here depend on various factors and can be optimized by the person skilled in the art with use of some experimentation. These heating parameters depend on the softening point of the foam material used, on the boiling point or decomposition temperature of the blowing agent used, on the pore size and/or density of the material, on the thickness of the material and on the distance between the radiation sources and the foam core. An increase of radiation intensity is generally necessary in the case of materials of greater robustness, of higher density of the material, of greater thickness of the material and of greater distance from the radiation sources. The radiation intensity can moreover be varied as a function of the degree of shaping to be achieved. The adjustment of the radiation intensity is therefore generally such that a temperature of from 170 to 250° C. is achieved in the middle of the P(M)I particle.

In one particular embodiment of the present invention, said heating unit has been integrated into a multistage production system. Two variants are in particular of interest here. In the first variant, the prefoamed P(M)I particles are passed directly into a shaping mould after the heating unit. There are many variants of such shaping moulds. One possibility here is shaping simply of the foam material by means of in-mould foaming. This type of downstream process can be found by way of example in EP 2 598 304. Another possibility here is not only to mould the foam but at the same time to provide this with outer materials, for example composite materials. It is therefore easily possible to produce complex-shaped foam core composite materials from the prefoamed P(M)I particles of the invention.

It is possible here to produce mouldings or foam core composites with a markedly more homogeneous pore structure and without defects; this is not the case with particles that have not been prefoamed. By integrating the process of the invention into an entire process for the production of complex-shaped foam materials or foam core composite materials, it is therefore possible to produce these rapidly, in short cycle times and with particularly good quality. Furthermore, in in-mould foaming the charging of particles to moulds is easier when prefoamed particles are used than when particles are used that are not prefoamed, therefore being significantly smaller. This advantage is naturally less important for very thin-walled mouldings, and in that type of case it is therefore possible to use particles that have not been prefoamed. It is therefore possible to charge prefoamed particles to the main regions of moulds and to charge particles that have not been prefoamed to those regions which lead to very thin-walled regions of the mould.

Another great advantage of the present process in comparison with the prior art is that although the prefoaming takes place rapidly it is at the same time sufficiently non-aggressive to avoid damage to the surface of the P(M)I particles.

In the second, equally preferred variant, the integration of the process of the invention into an entire process is such that the prefoamed P(M)I particles are first transported into a storage container. The material is then charged from said storage container to at least one shaping mould. This variant is clearly particularly useful for entire processes in which there is a heating unit combined with a plurality of shaping moulds. In this way, the heating unit can be operated continuously, while the shaping moulds naturally operate batchwise with fixed cycle times.

It is preferable that the heating unit has a plurality of IR light sources, so that the surface of the graduate grains is heated uniformly. Surprisingly, it has been found that the non-aggressive heating of the material can provide rapid and efficient prefoaming without any attendant damage to the material. When the present process is carried out correctly it in particular eliminates the damage to the rigid foam surface that can be observed by way of example on heating in an oven. The radiation in the IR spectral region used penetrates the gas phase of the foam cells without absorption, and directly heats the cell wall matrix. Particularly surprisingly, it has been found here that this type of heating with IR radiation can achieve particularly uniform heat distribution even in relatively large particles.

Another possibility, in order to improve adhesion between foam core material and outer layers, which is important in subsequent steps for the production of composite materials, is to use adhesion promoters. Said adhesion promoters can also have been applied on the surface of the P(M)I particles before the prefoaming of the invention begins, this being an alternative to application in a subsequent step. In particular, polyamides or poly(meth)acrylates have proved to be suitable as adhesion promoters. However, it is also possible to use low-molecular-weight compounds which are known to the person skilled in the art from the production of composite materials, in particular as required by the matrix material used for the outer layer.

In particular, the process of the invention has the great advantage that it can be carried out very rapidly and therefore in combination with downstream processes with very short cycle times. The process of the invention can therefore be integrated very successfully within a mass production system.

The process parameters to be selected for the entire process of the invention depend on the system used in any individual case and on the design thereof, and also on the materials used. They can easily be determined by the person skilled in the art by a little preliminary experimentation.

The material used in the invention is P(M)I, in particular PMI. These P(M)I foams are also termed rigid foams, and feature particular robustness. The P(M)I foams are normally produced in a two-stage process: a) production of a cast polymer and b) foaming of said cast polymer. In accordance with the prior art, these are then cut or sawn into the desired shape. An alternative which is so far less well established in industry is in-mould foaming, for which it is possible to use the process of the invention.

The process of the invention preferably uses P(M)I particles that have not been prefoamed with a particle size of from 0.5 to 5.0 mm, preferably from 1.0 to 4.0 mm.

Said P(M)I particles that have not been prefoamed can be produced by two different process variants, before these are used in the process of the invention. In a first variant, the P(M)I particles are obtained as granulate by grinding from a semifinished P(M)I product. This semifinished P(M)I product is the unfoamed sheet polymer described above, which is obtained as cast polymer.

The cast polymer is produced by first producing monomer mixtures which comprise, as main constituents, (meth) acrylic acid and (meth)acrylonitrile, preferably in a molar ratio of from 2:3 to 3:2. It is also possible to use other comonomers, for example esters of acrylic or methacrylic acid, styrene, maleic acid or itaconic acid or anhydrides thereof or vinylpyrrolidone. However, the proportion of the comonomers here should not be more than 30% by weight. Small amounts of crosslinking monomers can also be used, an example being allyl acrylate. However, the amounts should be at most from 0.05% by weight to 2.0% by weight.

The copolymerization mixture moreover comprises blowing agents which at temperatures of about 150 to 250° C. either decompose or vaporize and thus form a gas phase. The polymerization takes place below this temperature, and the cast polymer therefore comprises a latent blowing agent. The polymerization advantageously takes place in a block mould between two glass plates.

The production of semifinished PMI products of this type is known in principle to the person skilled in the art and can be found by way of example in EP 1 444 293, EP 1 678 244 or WO 2011/138060. Semifinished PMI products that may in particular be mentioned are those marketed in foamed form with the trade mark ROHACELL® by Evonik Industries AG. Semifinished acrylimide products (semifinished PI products) can be considered to be analogous to the PMI foams in relation to production and processing. However, the acrylimide products are markedly less preferred than other foam materials for reasons of toxicology.

In a second variant of the process of the invention, the P(M)I particles are suspension polymers which can be introduced directly per se into the process. The production of suspension polymers of this type can be found by way of example in DE 18 17 156 or in the European Patent Application with Application file reference EP 13155413.1.

It is preferable that the bulk density of the prefoamed P(M)I particles is from 40 to 400 kg/m$^3$, preferably from 60 to 300 kg/m$^3$ and particularly preferably from 80 to 220 kg/m$^3$.

The maximum size of the prefoamed P(M)I particles is moreover preferably from 1.0 to 25 mm, particularly preferably from 2.0 to 20 mm.

The prefoamed P(M)I particles produced in the invention can, as described, be further processed to give foam mouldings or foam core composite materials. Said foam mouldings or foam core composite materials can in particular be used in mass production by way of example for bodywork construction or for interior cladding in the automobile industry, interior parts in rail vehicle construction or shipbuilding, in the aerospace industry, in mechanical engineering, in the production of sports equipment, in furniture construction or in the design of wind turbines.

WORKING EXAMPLES

Material used as PMI granulate is marketed as PMI foam with the product name ROHACELL RIMA by Evonik Industries. The granulate was produced by means of grinding by a RS3806 chopper mill from Getecha from a polymerized polymer sheet that had not been prefoamed. The maximum diameter of the resultant granulate was 5 mm at the largest point.

Comparative Example 1

Prefoaming by Means of Convection Oven

The ground material that had not been prefoamed, from the mill, had an envelope density of about 1200 kg/m$^3$ and a bulk density of about 600 to 700 kg/m$^3$. These two densities are reduced by the prefoaming in an oven. This is achieved by variation of residence time, and also of the temperature. For this, the free-flowing ground material is distributed onto a metal sheet covered with release film. This should be achieved with maximum uniformity and, in order to guarantee homogeneous foaming, the layer thickness should not exceed the largest grain diameter. The sheet is then placed for by way of example 45 min. in the oven that has been preheated to prefoaming temperature.

The bulk density can thus be reduced from about 600-700 kg/m$^3$ to about 360-460 kg/m$^3$ in 30 minutes at a prefoaming temperature of 175° C.

Inventive Example 1

Prefoaming by Means of IR Chamber

The sources used were from KRELUS Infrared AG, with the following properties:

These are medium-wave metal foil sources with main wavelength 2.5 µm (effective up to 9.6 µm). 2.5 µm here correspond to a temperature of 850° C. calculated by the Wien method. The support is a metal housing, and the metal foils serve as resistance material and are corrugated in order to provide a large emission surface.

In the IR chamber there are sources arranged over the entire upper and lower surface (3*3 modules) with a nominal power rating of (3*3*2.5 kW): 22.5 kW total power rating. The sources have continuously variable control and do not have active cooling. The large-area source is composed as a module with a single-module size of 123×248 mm, source height being 65 mm.

The chamber equipped with the sources of IR radiation is operated for 1.5 h with large-area source switched on, with a resultant surface temperature of about 160° C. and a resultant underside temperature of about 135° C. The aim of this is to improve reproducibility of the results with respect to prefoaming that is carried out continuously.

The prefoaming material is then distributed as described above on the preheated carrier, which is placed in the chamber. For the prefoaming process, the upper and lower source field is activated. Radiation sources used comprised a plurality of sources emitting at a wavelength maximum of from 1.4 to 3.0 μm. Once the foaming time of 10 min. has expired, the sources are switched off, and the carrier with ground material is removed from the oven.

Example of prefoaming parameters: With a prefoaming temperature of about 190° C., bulk density can be reduced from about 600-700 kg/m³ to about 130 kg/m³ in 2 minutes. The diameter of the particles used, in each case at the thickest point, was from 1 to 5 mm. The diameter of the prefoamed particles, in each case at the thickest point, was from 2 to 20 mm.

Inventive Example 2

The method for Inventive Example 2 is analogous to that for Inventive Example 1, except that a different radiation source is used—a source from OPTRON GmbH:

These are short-wave sources emitting mainly at wavelength 1.2 μm. 1.2 μm here corresponds to a temperature of 2350 K calculated by the Wien method. The carrier is composed of aluminium profiles and metal sheets.

Again, this radiation source is modular. The combination here is termed IR cartridge. The set-up in this case has a source field with 7×2.75 kW sources using what are known as twin sources backed by gold reflector and with ventilators for cooling. The total radiative power of this set up is therefore 19.25 kW. The size of the source field is 560× 500×150 mm. That gives a heated area of 400×420 mm. The distance is analogous to that in Inventive Example 1.

With a set up of this type, results achieved were identical with those in Inventive Example 1 after as little as 5 min.

As can be seen from comparison of Comparative Example 1 and Inventive Examples 1 and 2, it is possible to achieve markedly lower bulk densities, i.e. markedly greater degrees of prefoaming, in a markedly shorter time by the method of the invention.

From Inventive Example 2 it is apparent that particularly efficient foaming is achieved when operations are carried out in the wavelength region of the maximum absorption of the PMI.

The invention claimed is:

1. A process for the production of prefoamed poly(meth) acrylimide (P(M)I) particles, comprising prefoaming unfoamed P(M)I particles by infrared radiation ("IR") with an IR source, at least 80% of which has a wavelength of from 1.4 to 10.0 μm,
    wherein the IR source used emits to an extent of at least 5% in a wavelength range from 5.0 to 9.0 μm, and
    wherein the temperature of the IR source, calculated by Wien's method, is from 780 K to 1800 K.

2. The process according to claim 1, wherein the IR source used emits to an extent of at least 5% in the wavelength range from 5.3 to 6.5 μm or from 7.8 to 8.9 μm.

3. The process according to claim 1, wherein the temperature of the IR source, calculated by Wien's method, is from 800 to 1200 K.

4. The process according to claim 1, wherein the unfoamed P(M)I particles have a particle size of from 0.5 to 5.0 mm.

5. The process according to claim 1, wherein the prefoaming is carried out within at most 5 min.

6. The process according to claim 1, wherein the unfoamed P(M)I particles are transported in a single layer on a conveyor belt through a heater unit having sources of IR.

7. The process according to claim 1, wherein the unfoamed P(M)I particles are obtained as granulate from a semifinished P(M)I product by grinding.

8. The process according to claim 1, wherein the unfoamed P(M)I particles are a suspension polymer.

9. The process according to claim 1, wherein the maximum size of the prefoamed P(M)I particles is from 1.0 to 25 mm.

10. The process according to claim 1, wherein a bulk density of the prefoamed P(M)I particles is from 60 to 300 kg/m.

11. A process, comprising:
    prefoaming unfoamed P(M)I particles by infrared radiation ("IR") with an IR source, at least 80% of which has a wavelength of from 1.4 to 10.0 μm,
    wherein the IR source used emits to an extent of at least 5% in a wavelength range from 5.0 to 9.0 μm,
    wherein the temperature of the IR source, calculated by Wien's method, is from 780 K to 1800 K,
    wherein the unfoamed P(M)I particles are transported in a single layer on a conveyor belt through a heater unit having sources of IR, and
    wherein after transport through the heating unit, the prefoamed P(M)I particles are transported directly into a shaping mould or into a storage container from which material is charged to at least one shaping mould.

* * * * *